(12) United States Patent
Sahraei et al.

(10) Patent No.: US 12,308,936 B2
(45) Date of Patent: May 20, 2025

(54) TECHNIQUES FOR CONFIGURING RECONFIGURABLE INTELLIGENT SURFACES IN WIRELESS COMMUNICATIONS

(71) Applicant: QUALCOMM Incorporated, San Diego, CA (US)

(72) Inventors: Saeid Sahraei, San Diego, CA (US); Yu Zhang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 516 days.

(21) Appl. No.: 17/711,776

(22) Filed: Apr. 1, 2022

(65) Prior Publication Data

US 2023/0318696 A1    Oct. 5, 2023

(51) Int. Cl.
*H04W 72/56*  (2023.01)
*H04B 7/155*  (2006.01)
(Continued)

(52) U.S. Cl.
CPC ..... *H04B 7/15542* (2013.01); *H04B 7/15507* (2013.01); *H04L 5/0023* (2013.01);
(Continued)

(58) Field of Classification Search
CPC .......................... H04B 7/155; H04B 7/15542; H04B 7/15507; H04W 72/04; H04W 72/046;
(Continued)

(56) References Cited

U.S. PATENT DOCUMENTS

| 8,774,226 B2 * | 7/2014 | Guo | H04L 5/0048 |
| | | | 370/332 |
| 11,770,175 B2 * | 9/2023 | Dai | H04W 48/12 |
| | | | 370/315 |

(Continued)

FOREIGN PATENT DOCUMENTS

| WO | WO-2021034556 A1 * | 2/2021 | ........... H04L 1/1812 |
| WO | WO-2021236510 A1 * | 11/2021 | ............. G06N 20/00 |

(Continued)

OTHER PUBLICATIONS

Partial International Search Report—PCT/US2023/014044—ISA/EPO—Jun. 5, 2023.
(Continued)

*Primary Examiner* — Hai V Nguyen
(74) *Attorney, Agent, or Firm* — Arent Fox, LLP

(57) ABSTRACT

Some aspects described herein relate to receiving, at a reconfigurable intelligent surface (RIS), a first configuration having a time interval for applying the first configuration to reflect signals from a network node, applying the first configuration to multiple antenna elements on the RIS for the time interval, and applying, based on expiration of the time interval, a second configuration, that is different from the first configuration, to the multiple antenna elements on the RIS. Other aspects relate to prioritizing configurations. Additional aspects relate to transmitting a default configuration and/or dynamic configuration to the RIS.

21 Claims, 8 Drawing Sheets

(51) Int. Cl.
*H04L 5/00* (2006.01)
*H04W 72/044* (2023.01)
*H04W 72/0446* (2023.01)
*H04W 72/29* (2023.01)

(52) U.S. Cl.
CPC ..... *H04W 72/0446* (2013.01); *H04W 72/046* (2013.01); *H04W 72/29* (2023.01); *H04W 72/56* (2023.01)

(58) Field of Classification Search
CPC ......... H04W 72/0446; H04W 72/0433; H04W 72/10; H04L 5/0023
See application file for complete search history.

(56) References Cited

U.S. PATENT DOCUMENTS

| | | | | |
|---|---|---|---|---|
| 11,848,709 | B2* | 12/2023 | Medra | H04B 7/04013 |
| 11,937,200 | B2* | 3/2024 | Li | H04W 56/005 |
| 11,953,585 | B2* | 4/2024 | Balasubramanian | G01S 5/0273 |
| 11,963,016 | B2* | 4/2024 | Gurelli | H04W 40/06 |
| 11,990,684 | B2* | 5/2024 | Gurelli | H04B 7/04013 |
| 12,003,305 | B2* | 6/2024 | Gurelli | H04B 7/0695 |
| 12,015,459 | B2* | 6/2024 | Wang | H04B 7/0617 |
| 12,057,920 | B2* | 8/2024 | Soryal | H04B 7/0639 |
| 2013/0044728 | A1* | 2/2013 | Guo | H04L 5/0048 370/330 |
| 2016/0105817 | A1* | 4/2016 | Frenne | H04L 1/0026 370/252 |
| 2016/0149679 | A1* | 5/2016 | Frenne | H04L 5/005 370/329 |
| 2016/0277954 | A1* | 9/2016 | Frenne | H04W 72/541 |
| 2016/0301505 | A1* | 10/2016 | Furuskog | H04W 72/00 |
| 2019/0082496 | A1* | 3/2019 | Yi | H04W 4/80 |
| 2020/0322113 | A1* | 10/2020 | Gao | H04L 5/001 |
| 2022/0132564 | A1* | 4/2022 | Ouchi | H04W 72/0453 |
| 2022/0322245 | A1* | 10/2022 | Park | H04W 52/325 |
| 2023/0089655 | A1* | 3/2023 | Yeo | H04L 5/0092 370/329 |
| 2023/0105787 | A1* | 4/2023 | Chen | H04L 5/0094 370/329 |
| 2023/0208479 | A1* | 6/2023 | Wang | H04B 7/0617 375/262 |
| 2023/0246674 | A1* | 8/2023 | Åström | H04B 7/145 375/262 |
| 2023/0258759 | A1* | 8/2023 | Wang | G01S 1/08 455/456.1 |
| 2023/0408677 | A1* | 12/2023 | Duan | G01S 13/878 |
| 2024/0106499 | A1* | 3/2024 | Sahraei | H04L 27/26025 |
| 2024/0107485 | A1* | 3/2024 | Duan | H04B 7/155 |
| 2024/0107576 | A1* | 3/2024 | Xu | H04L 5/0091 |
| 2024/0187823 | A1* | 6/2024 | Shrivastava | H04W 76/28 |
| 2024/0214166 | A1* | 6/2024 | Gao | H04L 5/0057 |
| 2024/0235622 | A1* | 7/2024 | Sahraei | H04B 7/1555 |
| 2024/0243780 | A1* | 7/2024 | Sahraei | H04B 7/022 |

FOREIGN PATENT DOCUMENTS

| | | | |
|---|---|---|---|
| WO | WO-2021239259 A1 * | 12/2021 | H04B 1/401 |
| WO | WO-2022015965 A1 * | 1/2022 | G01S 1/0423 |

OTHER PUBLICATIONS

International Search Report and Written Opinion—PCT/US2023/014044—ISA/EPO—Jul. 28, 2023.

* cited by examiner

TECHNIQUES FOR CONFIGURING RECONFIGURABLE INTELLIGENT SURFACES IN WIRELESS COMMUNICATIONS

BACKGROUND

Aspects of the present disclosure relate generally to wireless communication systems, and more particularly, to reconfigurable intelligent surfaces (RISs).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

RISs can be provided in 5G NR to reflect signals from a network node to other devices to extend 5G coverage with negligible power consumption. The RISs can be near passive devices that reflect impinging waves to a desired direction. The reflection direction of the RIS can be controlled by the network node (e.g., a gNB).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a reconfigurable intelligent surface (RIS) is provided that includes multiple antenna elements, a memory configured to store instructions, and one or more processors communicatively coupled with the memory. The one or more processors are configured to receive a first configuration having a time interval for applying the first configuration to reflect signals from a network node, apply the first configuration to the multiple antenna elements for the time interval, and apply, based on expiration of the time interval, a second configuration, that is different from the first configuration, to the multiple antenna elements.

In another aspect, a RIS is provided that includes multiple antenna elements, a memory configured to store instructions, and one or more processors communicatively coupled with the memory. The one or more processors are configured to receive a first configuration having a first time interval for applying the first configuration to reflect signals from a network node, apply the first configuration to the multiple antenna elements starting at the first time interval, receive a second configuration having a second time interval for applying the second configuration to reflect signals from the network node, wherein the second time interval at least partially overlaps the first time interval, and apply, based at least in part on a first priority associated with the first configuration or a second priority associated with the second configuration, the second configuration over the second time interval including at least a portion that overlaps the first time interval.

In another aspect, a method for wireless communication is provided that includes receiving, at a RIS, a first configuration having a time interval for applying the first configuration to reflect signals from a network node, applying the first configuration to multiple antenna elements on the MS for the time interval, and applying, based on expiration of the time interval, a second configuration, that is different from the first configuration, to the multiple antenna elements on the MS.

In another aspect, a method for wireless communication is provided that includes receiving, at a RIS, a first configuration having a first time interval for applying the first configuration to reflect signals from a network node, applying the first configuration to multiple antenna elements on the RIS starting at the first time interval, receiving, at the RIS, a second configuration having a second time interval for applying the second configuration to reflect signals from the network node, wherein the second time interval at least partially overlaps the first time interval, and applying, based at least in part on a first priority associated with the first configuration or a second priority associated with the second configuration, the second configuration over the second time interval including at least a portion that overlaps the first time interval.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
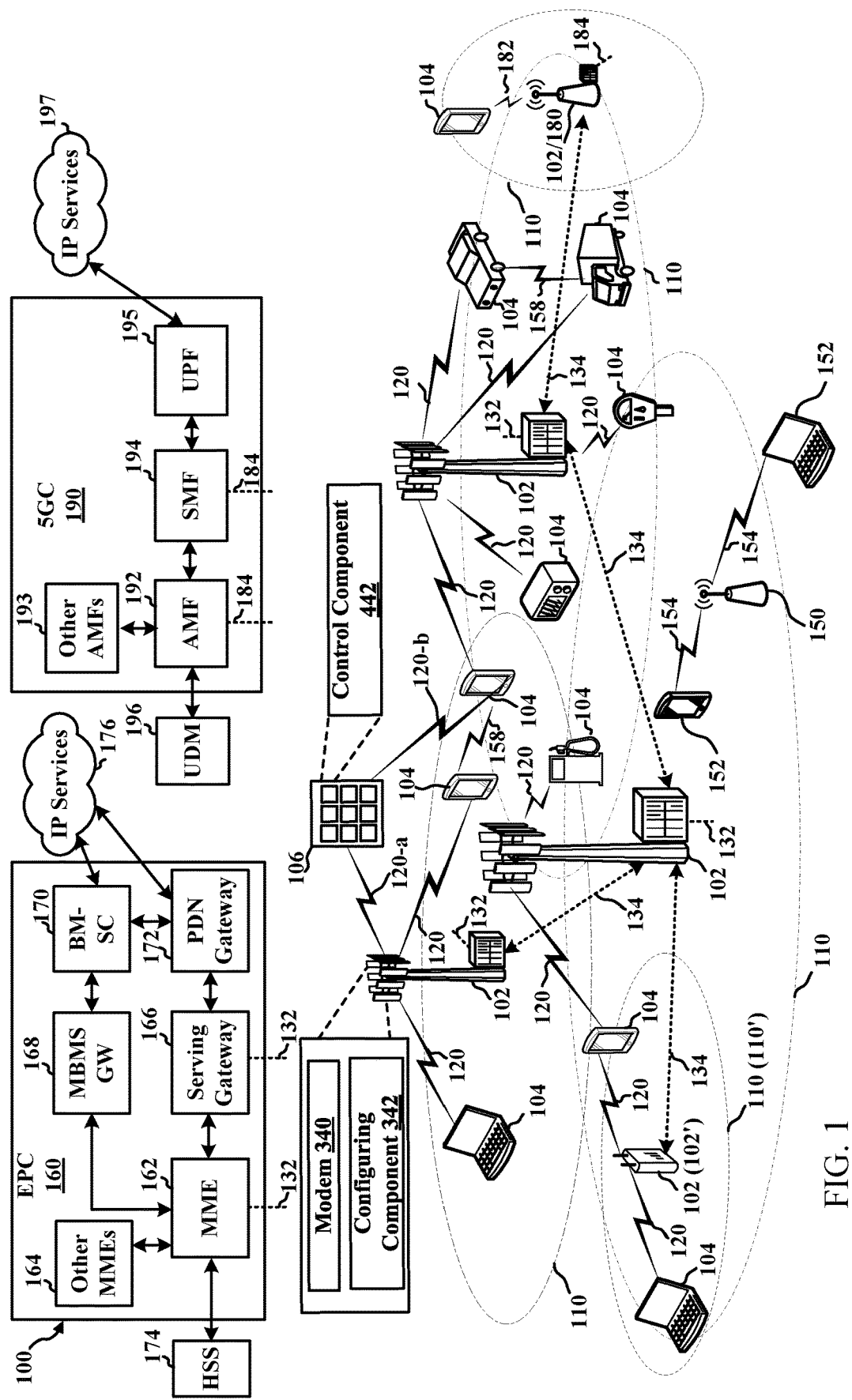
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring reconfigurable intelligent surfaces (RISs) to reflect signals from a network node in a certain direction. RISs can include nearly passive devices with antenna elements that can be configured to reflect signals from the network node. An MS can apply a configuration to supply power, amplification, phase shifting, etc. to the antenna elements to achieve a spatial direction for reflecting the signals from the network node. The network node (e.g., a gNB, a portion thereof, a component of a disaggregated gNB, etc.) can configure the MS in some examples. For example, the network node can transmit a configuration to the MS, and the MS may include a control node operable to receive and apply the configuration at the MS. For example, the network node can configure the MS using an over-the-air (OTA) control channel, which may be a sequence-based control channel, a physical downlink control channel (PDCCH)-like control channel, etc. In an example, a sequence-based control channel can use a simple receiver at the MS that is less sensitive to frequency error and may support a large number of RISs. A PDCCH-like control channel can leverage existing PDCCH functionality, but may use a more complex receiver.

In any case, for example, the network node can transmit the control channel in dedicated resources that may be independent from a downlink bandwidth part (BWP). In addition, for example, a scrambling sequence can be used for transmitting the control channel and may depend on an identifier (ID) of the network node (e.g., gNB ID) and a RIS ID. In another example, where the control channel resource overlaps with an active BWP, the network node can indicate the overlap to any impacted devices (e.g., user equipment (UEs) served by the gNB). In addition, in an example, the RIS can track time and/or frequency (e.g., synchronize time and/or frequency with the network node) based on the RIS control channel received at the RIS. For example, in 5G NR, communications can be based on a symbol, such as an orthogonal frequency division multiplexing (OFDM) symbol that can be defined in a time division, such as 1 millisecond, and/or can be defined as part of a slot that includes multiple symbols. In an example, the network node can configure the RIS by transmitting control information that specifies a beam or configuration of the RIS (e.g., a configuration for antenna elements of the RIS) within a specific time interval. For example, the time interval may be indicated by a start symbol (or slot of symbols) and a number of symbols (or a number of slots) indicating a duration for the time interval.

Aspects described herein relate to using, at a RIS, beams or configurations of beams or configurations of antenna elements to achieve beamforming of beams. For example, the RIS can receive a configuration indicating a time interval for applying the configuration. Outside of the time interval (e.g., before and/or after the time interval), however, the RIS can apply another configuration, such as a default configuration, an active periodic configuration, etc. For example, the default or periodic configuration may also be configured for the RIS by the network node, or may be configured by or otherwise stored in a memory of the RIS (or a control unit of the RIS), etc. Other aspects described herein relate to selecting, at the RIS, a configuration to utilize when multiple configurations are received that indicate time intervals that at least partially overlap. For example, the RIS can apply the configuration associated with a higher priority, or associated with a channel having a higher priority, a latest received configuration (e.g., where the configurations are associated with a same priority or otherwise), etc.

For example, specifying or enabling use of a default configuration at the RIS can allow the RIS to operate outside of time intervals where the network node configures the RIS. In addition, allowing prioritization of configurations with conflicting time intervals can result in improved coverage for the higher priority communications. In either case, reception quality of communications can be increased, which can improve throughput and thus user experience of UEs receiving the signals.

The described features will be presented in more detail below with reference to FIGS. 1-9.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In an example, the wireless communications system and access network 100 may also include a RIS 106 that can reflect signals received from a base station 102, gNB 180, etc. to a UE 104. In one example, the MS 106 can include a control component 442 (e.g., a control unit) for reflecting signals received from the base station 102, gNB 180, etc. to a UE 104 and/or vice versa, as described further herein. In addition, some nodes may have a modem 340 and configuring component 342 for configuring a RIS, as described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs (e.g., UE 104) may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. In addition, in this regard, UEs 104 can use a portion of frequency in the 5 GHz unlicensed frequency spectrum in communicating with the small cell 102', with other cells, with one another using sidelink communications, etc. The UEs 104, small cell 102', other cells, etc. can use other unlicensed frequency spectrums as well, such as a portion of frequency in the 60 GHz unlicensed frequency spectrum.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include machine type communications (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, in a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.), including base station 102 described above and further herein, may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as virtually distributing functionality for at least one unit, which can enable flexibility in network design. The various units of the disaggregated base station, or disaggregated RAN architecture, can be configured for wired or wireless communication with at least one other unit.

In an example, the RIS 106 can include a control component 442, which can be, be part of, or otherwise include, a control unit, for configuring one or more antenna elements or other portion of the RIS 106. For example, control component 442 can be co-located with the RIS 106 or may be remotely-located or otherwise communicatively coupled with the RIS 106 to facilitate controlling the one or more antenna elements or other portions thereof. For example, control component 442 can control the one or more antenna elements to amplify power to signals received and reflected by the antenna elements, to apply a phase to signals that are received and reflected by the antenna elements, etc. to achieve a spatial direction for reflected signals. In an example, the RIS 106 can be controlled to receive signals 120-a from the base station 102 or gNB 180, and reflect the signals 120-b to a UE, and/or vice versa, in a spatial direction configured for or by the RIS 106. For example, configuring component 342 can configure the RIS 106 to reflect the signals in certain directions, where configuring component 342 can send the configuration to the RIS 106 using OTA signaling, such as control signaling (e.g., sequence-based control channel for RISs, PDCCH or PDCCH-like control channel for RISs, etc.). Control component 442 can apply the received configuration for a specified time interval, revert to a default configuration after the time interval, resolve conflicts between configurations that overlap in time interval (e.g., based on a priority, a time at which the configuration is received, etc.), and/or the like.

Figure 2:
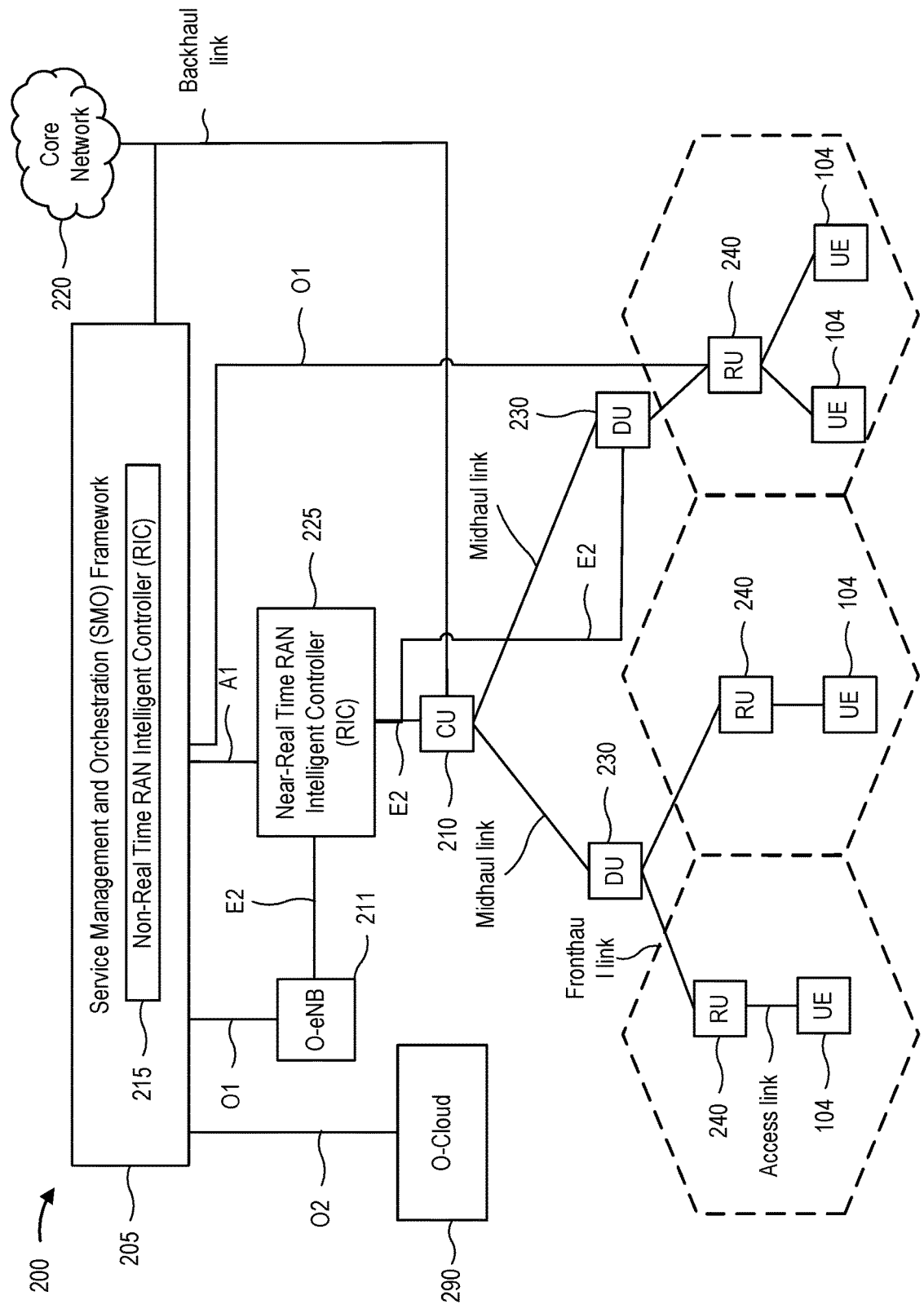
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT MC 225. The Non-RT MC 215 may be coupled to or communicate with (such as via an A1 interface) the Near-RT MC 225. The Near-RT MC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Turning now to FIGS. 3-9, aspects are depicted with reference to one or more components and one or more methods that may perform the actions or operations described herein, where aspects in dashed line may be optional. Although the operations described below in FIGS. 5-8 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
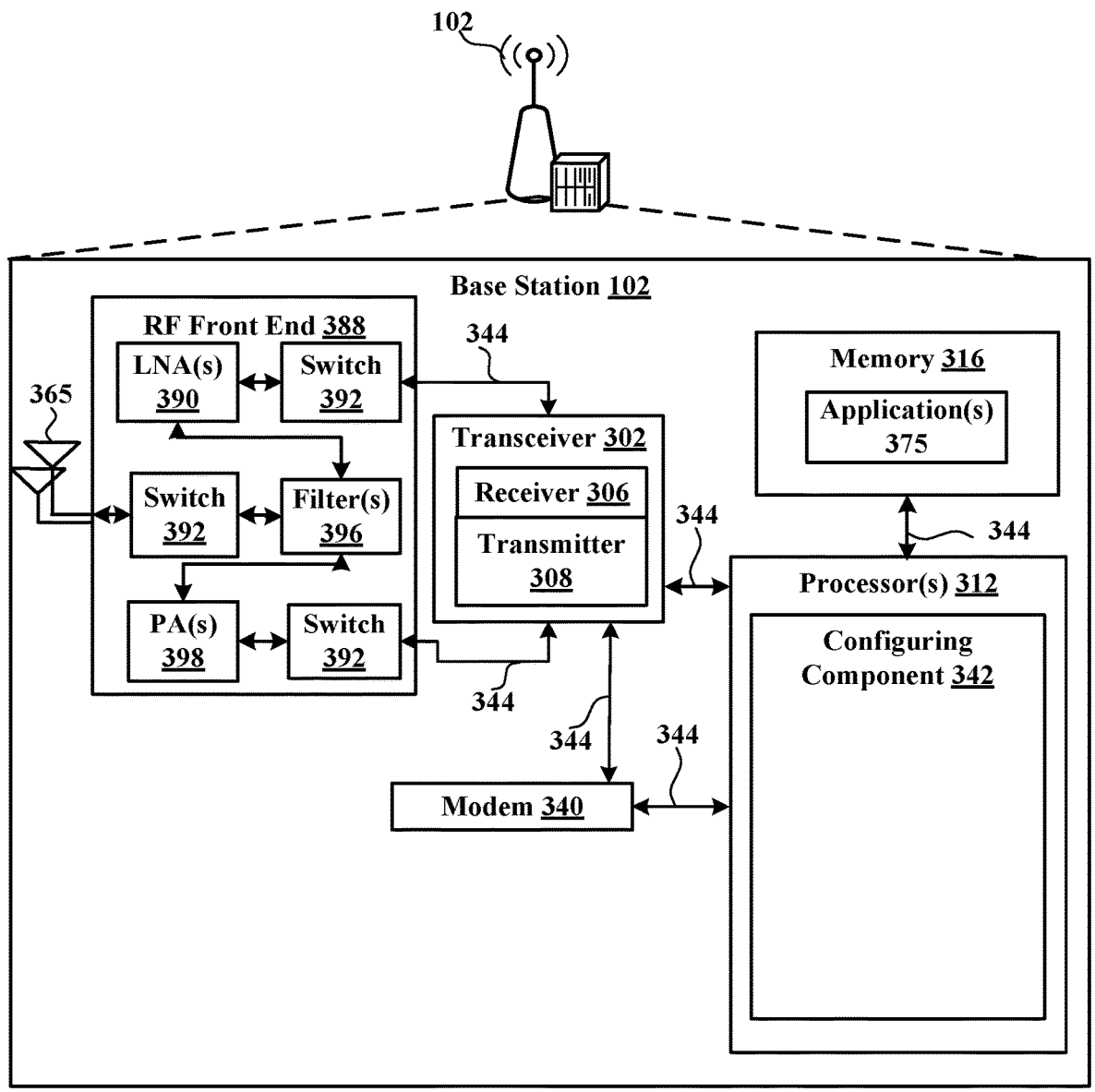
FIG. 3 is a block diagram illustrating an example of a base station, in accordance with various aspects of the present disclosure.

Referring to FIG. 3, one example of an implementation of base station 102, which may include a monolithic base station, disaggregated base station, or other network node, may include a variety of components, some of which have already been described above and are described further herein, including components such as one or more processors 312 and memory 316 and transceiver 302 in communication via one or more buses 344, which may operate in conjunction with modem 340 and/or configuring component 342 for configuring a MS to reflect signals in a certain direction, as described herein.

In an aspect, the one or more processors 312 can include a modem 340 and/or can be part of the modem 340 that uses one or more modem processors. Thus, the various functions related to configuring component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with configuring component 342 may be performed by transceiver 302.

Also, memory 316 may be configured to store data used herein and/or local versions of applications 375 or configuring component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, nonvolatile memory, and any combination thereof. In an aspect, for example, memory 316 may be a non-transitory computer-readable storage medium that stores one or more computer-executable codes defining configuring component 342 and/or one or more of its subcomponents, and/or data associated therewith, when base station 102 is operating at least one processor 312 to execute configuring component 342 and/or one or more of its subcomponents.

Transceiver 302 may include at least one receiver 306 and at least one transmitter 308. Receiver 306 may include hardware and/or software executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by a UE 104. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware and/or software executable by a processor for transmitting data, the code comprising instructions and being stored in a memory (e.g., computer-readable medium). A suitable example of transmitter 308 may including, but is not limited to, an RF transmitter.

Moreover, in an aspect, base station 102 may include RF front end 388, which may operate in communication with one or more antennas 365 and transceiver 302 for receiving and transmitting radio transmissions, for example, receiving wireless communications transmitted by at least one UE 104, transmitting wireless communications to at least one UE 104, a RIS 106, etc. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that base station 102 can communicate with, for example, one or more UEs 104. In an aspect, for example, modem 340 can configure transceiver 302 to operate at a specified frequency and power level based on a configuration of the base station 102 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of base station 102 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on configuration information associated with base station 102 as provided by the network.

Figure 4:
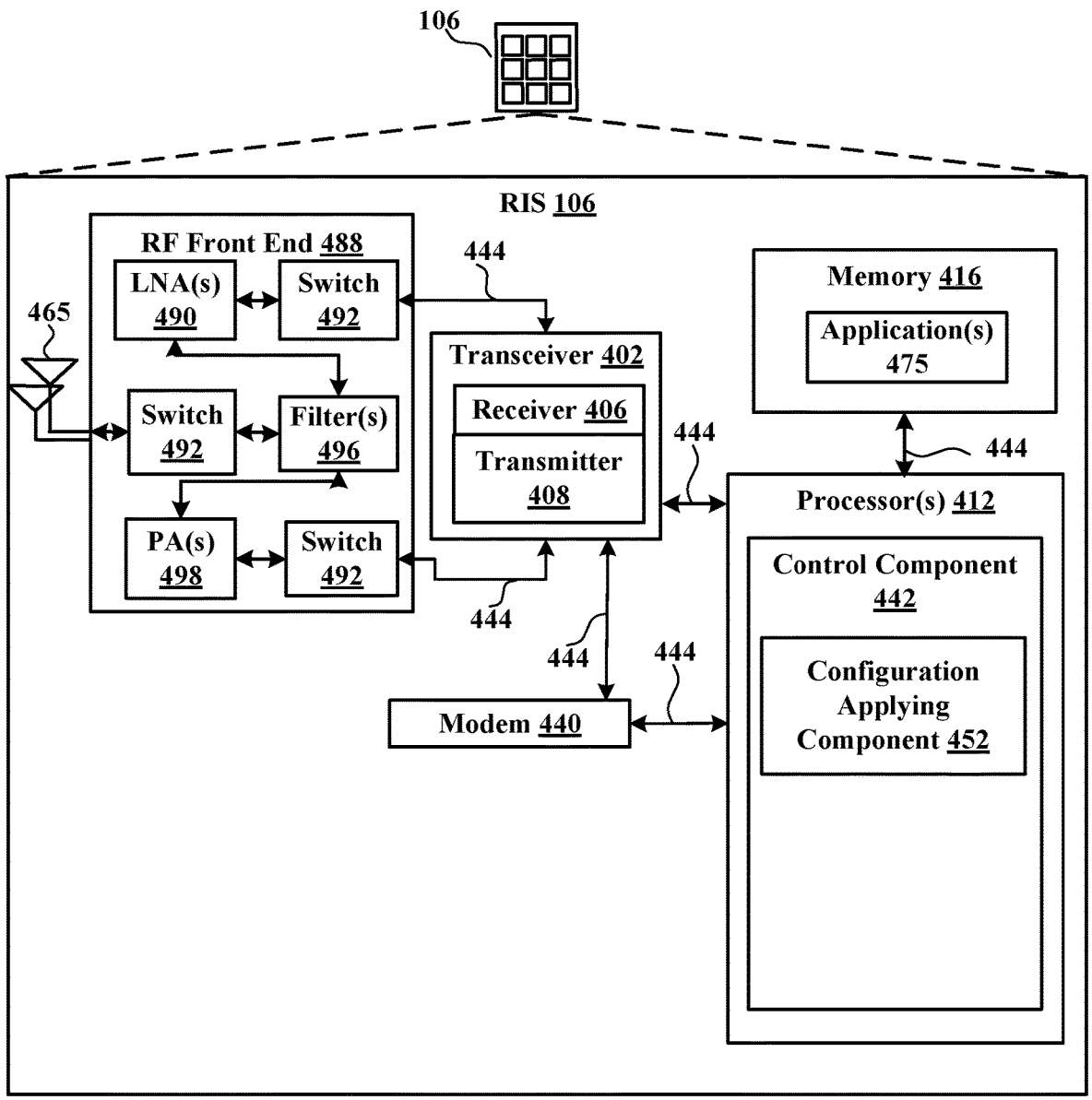
FIG. 4 is a block diagram illustrating an example of a reconfigurable intelligent surface (RIS), in accordance with various aspects of the present disclosure.

Referring to FIG. 4, one example of an implementation of a RIS 106 may include a variety of components, some of which have already been described above, but including components such as one or more processors 412 and memory 416 and transceiver 402 in communication via one or more buses 444, which may operate in conjunction with modem 440 and control component 442 for controlling the RIS 106 such to configure one or more antennas 465 or antenna elements, as described herein. For example, control component 442 may receive one or more configurations from one or more base stations 102 over a control channel, as described, and may include a configuration applying component 452 for applying the one or more configurations.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for receiving control information for operating the RIS 106, for configuring antenna elements of the RIS 106, etc., as opposed to base station operations. In one example, many of the described components can be included in the RIS 106 for receiving control channel information for configuring the RIS 106. The RIS 106, however, may reflect signals from a base station or gNB using the antenna elements 465.

Figure 5:
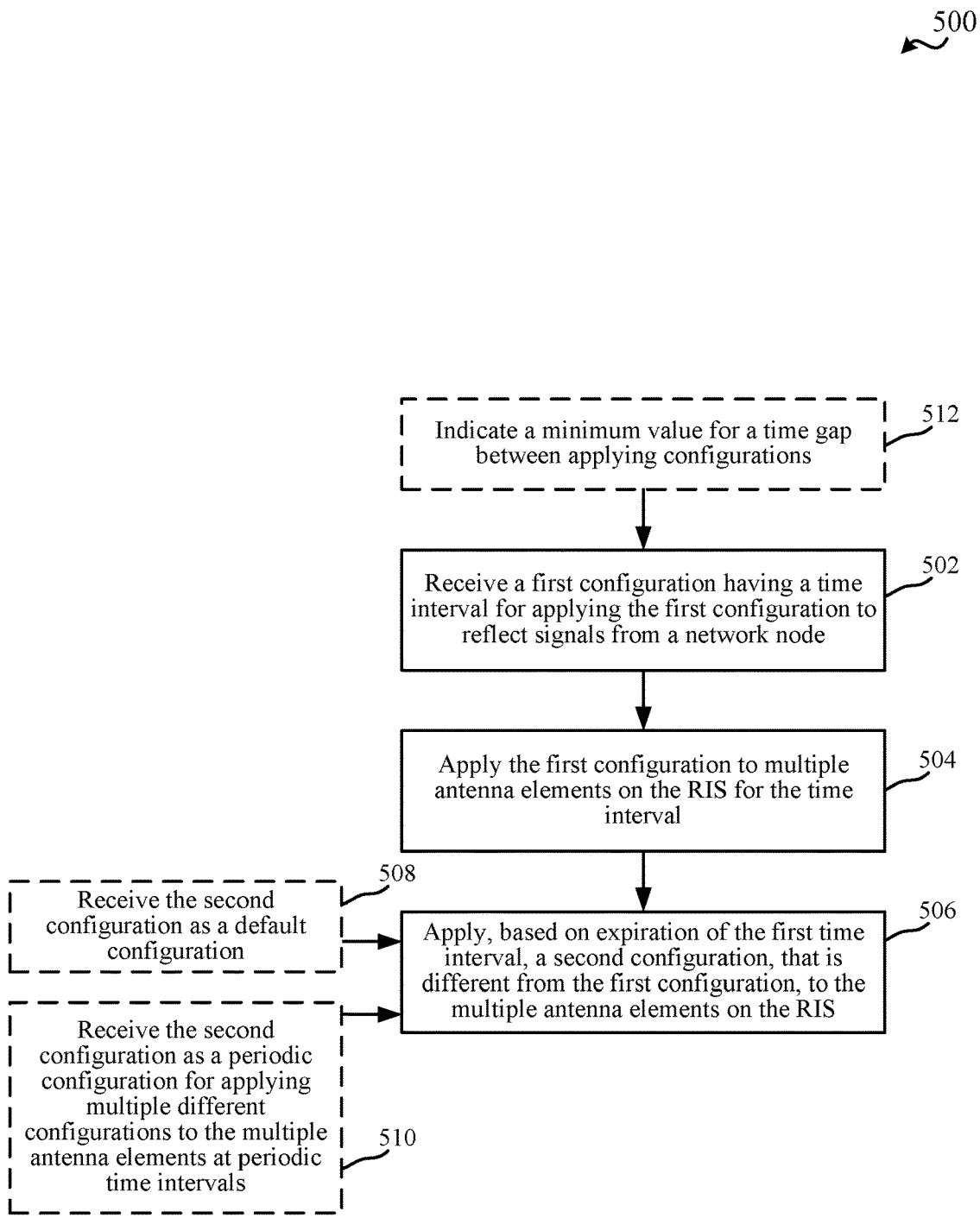
FIG. 5 is a flow chart illustrating an example of a method for configuring a RIS, in accordance with various aspects of the present disclosure.

FIG. 5 illustrates a flow chart of an example of a method 500 for configuring a MS. In an example, a MS 106, or corresponding control component 442, can perform the functions described in method 500 using one or more of the components described in FIGS. 1 and 4.

In method 500, at Block 502, a first configuration having a time interval for applying the first configuration to reflect signals from a network node can be received. In an aspect, control component 442, e.g., in conjunction with processor(s) 412, memory 416, transceiver 402, etc., can receive the first configuration having the time interval for applying the first configuration to reflect signals from the network node (e.g., a base station 102 or gNB 180, or a component of a disaggregated base station 102 or gNB 180, etc.). For example, control component 442 can receive the first configuration from the network node or another network node. In addition, for example, control component 442 can receive the first configuration in a control command (e.g., in control channel signaling) from the network node, such as in a sequence-based control channel that is based on a scrambling sequence generating using an identifier of the RIS 106 and/or an identifier of the network node. In another example, control component 442 can receive the first configuration in a PDCCH, or PDCCH-like, transmission from the network node, which can be over PDCCH resources indicated by the network node.

In one example, the network node can separately configure RIS control sub-band resources that overlap or do no overlap a downlink BWP configured by the network node. In this example, control component 442 can receive an indication of the DL BWP or the RIS control sub-band from the network node in radio resource control (RRC) or other signaling. Control component 442, in this example, can determine the RIS control sub-band and can receive, from the network node, the control channel information from the network node in the sequence-based control channel or PDCCH control channel in the RIS control sub-band. For example, control component 442 can monitor the RIS control sub-band (e.g., as configured by RRC signaling) for control channel information intended for the RIS 106. For example, control component 442 can attempt to decode signals received over the RIS control sub-band using a sequence of the RIS ID and network node ID. In another example, control component 442 can attempt to decode signals received over the RIS control sub-band using blind decoding for PDCCH, which may be based on a RIS ID and/or network node ID, etc.

In an example, the control information received by the RIS 106 can indicate a beam or configuration of the RIS 106 (or corresponding antenna elements) to achieve a desired beam for a specific time interval. In one example, the control information can indicate a phase shift, amplification, etc. to apply to one or more antenna elements of the RIS 106 for the specific time interval. In addition, the control information may indicate the time interval as a starting time (e.g., a starting symbol or slot) along with a duration (e.g., a number of symbols or slots) during which to apply the configuration to achieve the desired beam in the corresponding spatial direction.

In method 500, at Block 504, the first configuration can be applied to multiple antenna elements on the MS for the time interval. In an aspect, configuration applying component 452, e.g., in conjunction with processor(s) 412, memory 416, transceiver 402, control component 442, etc., can apply the first configuration to the multiple antenna elements on the RIS for the time interval (e.g., starting at the start time and continuing for the duration specified for the configuration). For example, configuration applying component 452 can apply the configuration by applying an amplification, phase shift, etc. to one or more of the multiple antenna elements of the RIS 106 for the configured duration. In this regard, when signals are received by the RIS 106 (e.g., from the network node or otherwise), the antenna element(s) receiving the signals can each apply the configured amplification and/or phase shift in reflecting the signals. When the duration is over, if another configuration is not received by the RIS 106 for a next symbol after the duration, the RIS 106 may apply a default configuration or otherwise revert to a previous configuration, as described herein.

In method 500, at Block 506, a second configuration that is different from the first configuration can be applied to the multiple antenna elements on the RIS based on expiration of the time interval. In an aspect, configuration applying component 452, e.g., in conjunction with processor(s) 412, memory 416, transceiver 402, control component 442, etc., can apply, based on expiration of the time interval, the second configuration, that is different from the first configuration, to the multiple antenna elements on the RIS. For example, the second configuration can include a default configuration or a previous configuration (e.g., a periodic configuration), and in either case can be a configuration to use in a case where a configuration is not received (e.g., from a network node) for a certain time interval. As such, in an example, configuration applying component 452 can apply the second configuration following expiration of the time interval for the received first configuration, before applying the received first configuration, etc. In one example, the RIS 106 can select or otherwise store information regarding the second configuration. In another example, RIS 106 can receive the second configuration (e.g., as a default configuration or periodic configuration) from the network node, which may be in control channel information, RRC signaling, etc.

In an example, the second configuration can include a default beam or default configuration, and the RIS 106 can return to this default configuration or state at the end of each configured interval. For example, the default state can be a pseudo-random configuration of the antenna elements of the MS 106, which can eliminate interference due to unintended reflections by scattering the impinging wave. In another example, the default state can correspond to a boresight beam. In this default state, for example, the antenna elements of the RIS 106 can be set to have a phase shift of zero to achieve the boresight beam. In another example, the default state can correspond to the antenna elements of the MS 106 being "turned off." In this example, the antenna elements of the MS 106 can absorb the impinging wave as opposed to reflecting it by decreasing or disabling the reflection. In an example, as described, the default beam may be RRC configured to the MS 106 by the network node.

In an example, in method 500, optionally at Block 508, the second configuration can be received as a default configuration. In an aspect, control component 442, e.g., in conjunction with processor(s) 412, memory 416, transceiver 402, etc., can receive the second configuration as the default configuration. For example, control component 442 can receive an indication of the default configuration in RRC signaling from the network node. In another example, control component 442 can receive an indication of the default configuration in a different control channel transmission from the network node. In one example, control component 442 can receive an update for the default configuration in a control channel transmission. In any case, as described, configuration applying component 452 can apply the default configuration when other configurations are not indicated for a certain time interval (e.g., after expiration of a time interval for a received configuration).

In another example, the default configuration can be a latest configuration. In this example, the MS 106 can preserve its latest configuration, until it receives further control information from the gNB. For example, where the MS 106 applies the first configuration, the MS 106 can retain this first configuration (e.g., even after a specified time duration) until a next configuration is received. In this regard, for example, configuration applying component 452 can apply the second configuration based on receiving the second configuration and/or based on expiration of the time interval for the first configuration. In one example, where the latest configuration is preserved, the control information (e.g., the configuration) may only specify the starting symbol but not the duration.

In another example, the default configuration can include or can be based on a periodic configuration. For example, the MS 106 may follow a periodic configuration, unless interrupted by a control command from the gNB to apply a different configuration. In an example, the MS 106 can return to its periodic configuration when the control command expires. In an example, in method 500, optionally at Block 510, the second configuration can be received as a periodic configuration for applying multiple different configurations to the multiple antenna elements at periodic time intervals. In an aspect, control component 442, e.g., in conjunction with processor(s) 412, memory 416, transceiver 402, etc., can receive the second configuration as a periodic configuration for applying different configurations to the multiple antenna elements at periodic time intervals. For example, control component 442 can receive the periodic configuration in RRC signaling or in control channel information (e.g., control command) from the network node. An example is shown in FIG. 6.

Figure 6:
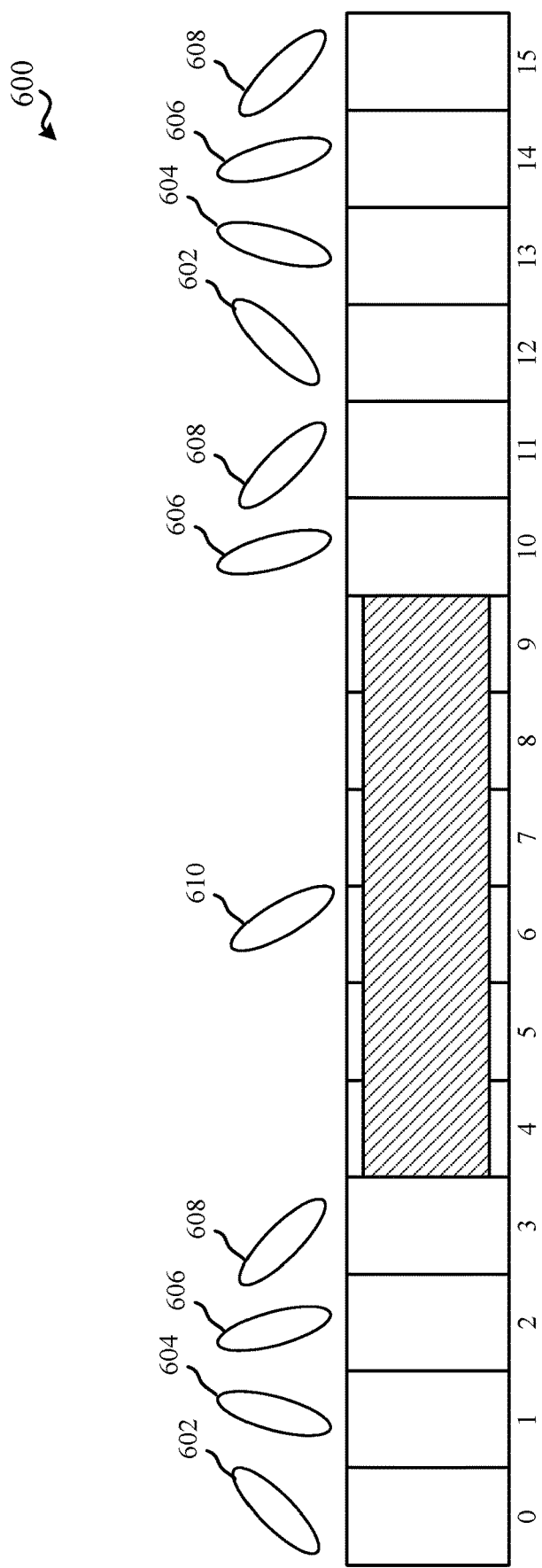
FIG. 6 illustrates an example of a timeline for applying beams or configurations for antenna elements of a MS to achieve beams in different spatial directions, in accordance with various aspects of the present disclosure.

FIG. 6 illustrates an example of a timeline 600 for applying beams or configurations for antenna elements of a RIS 106 to achieve beams in different spatial directions. The RIS 106 can be configured with a periodic configuration to use different beams 602, 604, 606, 608 in different time intervals (e.g., symbols or slots represented by indices 0, 1, 2, 3). This may be a periodic pattern that repeats itself once completed (e.g., in symbol or slot index 4, the configured beam may restart to be beam 602). Moreover, as described, the MS 106 can achieve the beams in different time intervals by applying amplifications and/or phase shifts to antenna elements of the MS 106. In this example, configuration applying component 452 can apply the periodic configuration over a time interval where a different configuration is not received by a network node.

In the example shown in FIG. 6, control component 442 can receive the first configuration indicating a starting symbol (or slot) index of 4 and a duration of symbols (or slots) of 6. In this example, configuration applying component 452 can apply the first configuration to achieve beam 610 for the duration of the time interval indicated by the configuration. After this time interval (e.g., at symbol or slot index 10), configuration applying component 452 can apply the periodic configuration until another configuration is received. In FIG. 6, the MS 106 can follow the periodic configuration in absence of a control command in symbol or slot indices 0, 1, 2, 3. The MS 106 control unit can receive a control command from a gNB, and the MS 106 can be configured with the associated beam for the duration of the control command in symbol or slot indices 4, 5, 6, 7, 8, 9. The MS 106 can return to the periodic configuration once the control command expires in symbol or slot indices 10, 11, 12, 13, 14, 15, etc. until a next control command is received.

For example, configuration applying component 452 can apply the periodic configuration after the received configuration time interval using various strategies (e.g., to determine which beam of the periodic configuration to use once the MS 106 returns to the periodic configuration). In one example, configuration applying component 452 can apply the periodic configuration at symbol or slot index 10 based on a slot index or symbols index (e.g., as a function thereof). In another example, configuration applying component 452 can apply the periodic configuration at symbol or slot index 10 based on starting over with a first beam in a configured list of beams corresponding to the periodic configuration (e.g., beam 602). In another example, where the beam in the received configuration (e.g., beam 610) corresponds to a beam in the list of beams for the periodic configuration, configuration applying component 452 can apply the periodic configuration at symbol or slot index 10 starting with the beam that follows the corresponding beam in the list. In another example, as shown in FIG. 6, configuration applying component 452 can apply the periodic configuration at symbol or slot index 10 starting with the beam 606 of the periodic configuration that is closest (e.g., in configuration parameters) to the beam 610 of the received configuration.

In another example, a gap may be indicated before applying the first configuration at Block 504 or after applying the first configuration (e.g., in applying the second configuration based on expiration of the first interval at Block 506). In one example, the time gap may be indicated in the first configuration received at Block 502, in the default configuration defined at, or received by, the RIS 106, in MS capability information transmitted to the network node (e.g., by the MS 106), etc. In any case, configuration applying component 452 can wait for a duration of the time gap before applying the first configuration at Block 504 (e.g., as measured from an indicated starting time, symbol, slot, etc. or otherwise). In another example, configuration applying component 452 can wait for a duration of the time gap before applying the second configuration after expiration of the first time interval, etc.

In an example, in method 500, optionally at Block 512, a minimum value for a time gap between applying configurations can be indicated. In an aspect, control component 442, e.g., in conjunction with processor(s) 412, memory 416, transceiver 402, etc., can indicate (e.g., to a network node) the minimum value for the time gap between applying configurations. In this example, configuration applying component 452 can wait the indicated minimum value for time gap before applying configurations, or can use a time gap received from the network node, which may be in consideration of the indicated minimum value. For example, control component 442 can indicate the minimum value to the network node in RRC or other signaling between the control component 442 and the network node, which may be based on a request from the network node for the minimum value capability or otherwise.

Figure 7:
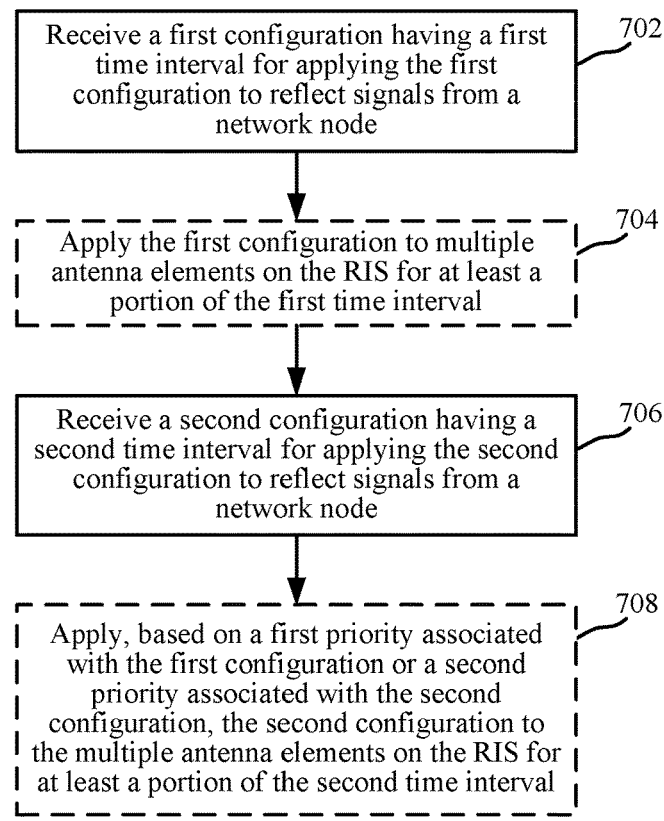
FIG. 7 is a flow chart illustrating an example of a method for prioritizing configurations at a MS, in accordance with various aspects of the present disclosure.

FIG. 7 illustrates a flow chart of an example of a method 700 for configuring a RIS with one of multiple configurations based on a priority. In an example, a MS 106, or corresponding control component 442, can perform the functions described in method 700 using one or more of the components described in FIGS. 1 and 4.

In method 700, at Block 702, a first configuration having a first time interval for applying the first configuration to reflect signals from a network node can be received. In an aspect, control component 442, e.g., in conjunction with processor(s) 412, memory 416, transceiver 402, etc., can receive the first configuration having the first time interval for applying the first configuration to reflect signals from the network node (e.g., a base station 102 or gNB 180, or a component of a disaggregated base station 102 or gNB 180, etc.). For example, control component 442 can receive the first configuration similarly as described above for receiving the configuration at Block 502 in method 500 of FIG. 5.

In method 700, optionally at Block 704, the first configuration can be applied to multiple antenna elements on the MS for at least a portion of the first time interval. In an aspect, configuration applying component 452, e.g., in conjunction with processor(s) 412, memory 416, transceiver 402, control component 442, etc., can apply the first configuration to the multiple antenna elements on the MS for at least a portion of the first time interval (e.g., starting at the start time and continuing for the duration specified for the configuration or a smaller duration where a second configuration of higher priority is received, as described further herein). For example, configuration applying component 452 can apply the configuration as similarly described above for applying the configuration at Block 504 in method 500 of FIG. 5.

In method 700, at Block 706, a second configuration having a second time interval for applying the second configuration to reflect signals from a network node can be received. In an aspect, control component 442, e.g., in conjunction with processor(s) 412, memory 416, transceiver 402, etc., can receive the second configuration having the second time interval for applying the second configuration to reflect signals from the network node (e.g., the same network node related to the first configuration or another network node). For example, control component 442 can receive the second configuration similarly as described above for receiving the configuration at Block 502 in method 500 of FIG. 5.

In method 700, optionally at Block 708, the second configuration can be applied to multiple antenna elements on the MS for at least a portion of the second time interval based on a first priority associated with the first configuration or a second priority associated with the second configuration. In an aspect, configuration applying component 452, e.g., in conjunction with processor(s) 412, memory 416, transceiver 402, control component 442, etc., can apply, based on the first priority associated with the first configuration or the second priority associated with the second configuration, the second configuration to multiple antenna elements on the RIS for at least the portion of the second time interval. For example, where configuration applying component 452 determines a higher priority for the first configuration, configuration applying component 452 may not apply the second configuration at least during the overlapping portion of the first time interval. For example, where configuration applying component 452 determines a higher priority for the second configuration, configuration applying component 452 may apply the second configuration at least during the second time interval, including the overlapping portion of the first time interval.

In a specific example, a gNB may configure the RIS 106 with a specific unicast beam for a duration of one slot. This gNB, or another gNB for example, may configure the RIS 106 with a different beam for a broadcast transmission which spans a number, x, of symbols. These multiple different configurations may overlap in time. Although these transmissions might be separated in frequency, RIS 106 may not able to perform per-subband reflection. For example, RIS configuration can be wideband. Thus, for example, configuration applying component 452 can determine which configuration to apply in a specific time interval (or at least an overlapping portion of a time interval over which the configurations may overlap).

In one example, the gNB may indicate multiple RIS configurations to the RIS 106 (e.g., by transmitting control channel information or control command to the control unit or control component 442 of the RIS 106). Each RIS configuration can include an starting (e.g., activation) time and duration, as described. Configuration applying component 452, for example, can identify which configuration has a higher priority for a time duration and can apply the prioritized configuration at least in that time duration. As described, for example, the gNB indication may include a semi-static configuration (e.g., periodic beam for synchronization signal block (SSB), physical random access channel (PRACH), etc.) or dynamic (e.g., unicast channels, such as PDCCH, physical downlink shared channel (PDSCH), etc.). In one example, configuration applying component 452 can determine a priority for a configuration based on one or more considerations or parameters of the communication, such as whether the configuration itself is received in a periodic or dynamic configuration, whether the configuration corresponds to a periodic beam (e.g., SSB or PRACH) or a dynamic channel (e.g., PDCCH, PDSCH), etc. In another example, configuration applying component 452 can determine a priority for a configuration based on whether the configuration or associated communication is for a broadcast channel or unicast channel, etc. In an example, configuration applying component 452 can determine a higher priority for configurations related to SSB, PRACH or other broadcast channels than for configurations related to unicast channels.

In another example, the priority may be indicated explicitly by the gNB to the RIS, as part of the control information or control command or corresponding configuration. In this example, configuration applying component 452 can determine a priority for a configuration as indicated in the configuration(s). In any case, if there are multiple configurations for overlapping time intervals, and the multiple configurations indicate or are determined as associated with a same priority, configuration applying component 452 can select the configuration to use based on other considerations, such as by adapting the latest configuration received from the gNB.

Figure 8:
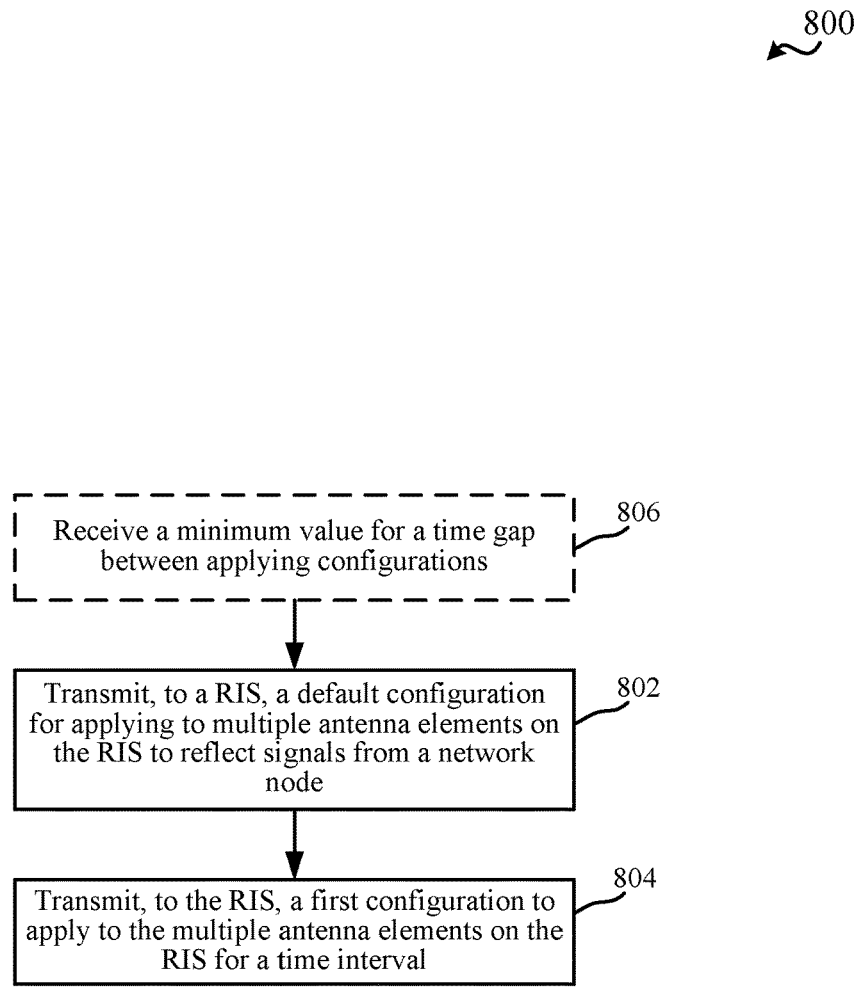
FIG. 8 is a flow chart illustrating an example of a method for transmitting configurations to a MS, in accordance with various aspects of the present disclosure.

FIG. 8 illustrates a flow chart of an example of a method 800 for transmitting configuration(s) to a MS. In an example, a base station 102 or gNB 180 (or a component of a disaggregated base station 102 or gNB 180) can perform the functions described in method 800 using one or more of the components described in FIGS. 1 and 3.

In method 800, at Block 802, a default configuration can be transmitted to a RIS for applying to multiple antenna elements on the RIS to reflect signals from a network node. In an aspect, configuring component 342, e.g., in conjunction with processor(s) 312, memory 316, transceiver 302, etc., can transmit, to the RIS, the default configuration for applying to the multiple antenna elements on the RIS to reflect signals from the network node. For example, the network node can transmit the default configuration to the RIS using control channel information (e.g., a control command) over a sequence-based control channel, PDCCH-like control channel, etc., as described, over RRC signaling, and/or the like. As described, the RIS 106 can apply the default configuration when other dynamically-received configurations are expired and before receiving a next dynamically-received configuration.

In another example, the default configuration may include a periodic configuration, as described. In an example, the default configuration may indicate a list of beams or configurations for applying in different time intervals, a length of the time intervals (or the period), etc. In yet another example, the default configuration may indicate one or more parameters for the MS 106 to use in determining a next beam or configuration in the list of beams or configurations to apply when a received configuration expires, as described above.

In method 800, at Block 804, a first configuration can be transmitted to a RIS for applying to multiple antenna elements on the RIS for a time interval. In an aspect, configuring component 342, e.g., in conjunction with processor(s) 312, memory 316, transceiver 302, etc., can transmit, to the RIS, the first configuration to apply the multiple antenna elements on the RIS for the time interval. As described, the first configuration can indicate the first time interval as a starting time (e.g., a starting symbol or slot index) and aa duration (e.g., a number of symbols or slots for applying the first configuration). As described, for example, the RIS can apply the first configuration during the time interval, and then can revert to the default configuration when the time interval expires.

In method 800, optionally at Block 806, a minimum value for a time gap between applying configurations can be received. In an aspect, configuring component 342, e.g., in conjunction with processor(s) 312, memory 316, transceiver 302, etc., can receive the minimum value for the time hap between applying configurations. In an example, configuring component 342 can include this time gap value or another value that complies with the minimum time gap value in the first configuration or the default configuration, so the RIS 106 can use the time gap value in applying the configuration(s).

The components of the RIS 106 may, individually or collectively, be implemented with one or more application specific integrated circuits (ASICs) adapted to perform some or all of the applicable functions in hardware. Similarly, the components of the base station 102 may, individually or collectively, be implemented with one or more ASICs adapted to perform some or all of the applicable functions in hardware.

The following aspects are illustrative only and aspects thereof may be combined with aspects of other embodiments or teaching described herein, without limitation.

Aspect 1 is a method for wireless communication including receiving, at a RIS, a first configuration having a time interval for applying the first configuration to reflect signals from a network node, applying the first configuration to multiple antenna elements on the RIS for the time interval, and applying, based on expiration of the time interval, a second configuration, that is different from the first configuration, to the multiple antenna elements on the MS.

In Aspect 2, the method of Aspect 1 includes where the second configuration is a default configuration to be applied when a received configuration expires, where the default configuration indicates a pseudo-random configuration for each of the multiple antenna elements.

In Aspect 3, the method of Aspect 2 includes where the pseudo-random configuration indicates a different phase shift to be applied to each of the multiple antenna elements.

In Aspect 4, the method of any of Aspects 1 to 3 includes where the second configuration is a default configuration to be applied when a received configuration expires, where the default configuration indicates a zero phase shift to be applied to each of the multiple antenna elements.

In Aspect 5, the method of any of Aspects 1 to 4 includes where the second configuration is a default configuration to be applied when a received configuration expires, where the default configuration indicates decreasing or disabling reflection from each of the multiple antenna elements.

In Aspect 6, the method of any of Aspects 1 to 5 includes where the second configuration is a default configuration to be applied when a received configuration expires, and receiving, from the network node, the default configuration in RRC signaling.

In Aspect 7, the method of any of Aspects 1 to 6 includes receiving, from the network node, the second configuration, where the expiration of the time interval is based on a starting time indicated for the second configuration.

In Aspect 8, the method of any of Aspects 1 to 7 includes where the second configuration is part of a periodic configuration of applying multiple different configurations to the multiple antenna elements on the RIS at different periodic time intervals.

In Aspect 9, the method of Aspect 8 includes where applying the first configuration includes switching from one of the multiple different configurations of the periodic configuration to the first configuration, and determining the second configuration as a different one of the multiple different configurations in the periodic configuration based on a slot index or a symbol index.

In Aspect 10, the method of any of Aspects 8 or 9 includes where applying the first configuration includes switching from one of the multiple different configurations of the periodic configuration to the first configuration, and determining the second configuration as a first one of the multiple different configurations in the periodic configuration.

In Aspect 11, the method of any of Aspects 8 to 10 includes where applying the first configuration includes switching from one of the multiple different configurations of the periodic configuration to the first configuration, and determining the second configuration as a next one of the multiple different configurations in the periodic configuration after the first configuration.

In Aspect 12, the method of any of Aspects 8 to 11 includes where applying the first configuration includes switching from one of the multiple different configurations of the periodic configuration to the first configuration, and determining the second configuration as a next one of the multiple different configurations in the periodic configuration after one of the multiple different configurations in the periodic configuration that is closest to the first configuration.

In Aspect 13, the method of any of Aspects 1 to 12 includes where applying the first configuration is after a time gap from a start of the time interval indicated for the first configuration.

In Aspect 14, the method of Aspect 13 includes indicating, to the network node, a minimum value for the time gap.

In Aspect 15, the method of any of Aspects 1 to 14 includes where applying the second configuration is after a time gap from an end of the time interval indicated for the first configuration.

In Aspect 16, the method of Aspect 15 includes indicating, to the network node, a minimum value for the time gap.

Aspect 17 is a method for wireless communication including receiving, at a RIS, a first configuration having a first time interval for applying the first configuration to reflect signals from a network node, applying the first configuration to multiple antenna elements on the RIS starting at the first time interval, receiving, at the RIS, a second configuration having a second time interval for applying the second configuration to reflect signals from the network node, wherein the second time interval at least partially overlaps the first time interval, and applying, based at least in part on a first priority associated with the first configuration or a second priority associated with the second configuration, the second configuration over the second time interval including at least a portion that overlaps the first time interval.

In Aspect 18, the method of Aspect 17 includes identifying the first priority based on whether the first configuration is a semi-static configuration or a dynamic configuration, and identifying the second priority based on whether the second configuration is a semi-static configuration or a dynamic configuration.

In Aspect 19, the method of any of Aspects 17 or 18 includes identifying the first priority based on a first channel associated with the first configuration, and identifying the second priority based on a second channel associated with the second configuration.

In Aspect 20, the method of any of Aspects 17 to 19 includes receiving an indication of the first priority in the first configuration and receiving an indication of the second priority in the second configuration.

In Aspect 21, the method of any of Aspects 17 to 20 includes where applying the second configuration includes switching from the first configuration to the second configuration based on the second configuration having a second priority that is the same as a first priority of the first configuration, and based on receiving the second configuration after the first configuration.

Aspect 22 is a method for wireless communication including transmitting, to a RIS, a default configuration for applying to multiple antenna elements on the RIS to reflect signals from a network node in time intervals other than those defined in other configurations, and transmitting, to the RIS, a first configuration to apply to the multiple antenna elements on the RIS for a time interval.

In Aspect 23, the method of Aspect 22 includes where the default configuration indicates a pseudo-random configuration for each of the multiple antenna elements.

In Aspect 24, the method of Aspect 23 includes where the pseudo-random configuration indicates a different phase shift to be applied to each of the multiple antenna elements.

In Aspect 25, the method of any of Aspects 22 to 24 includes where the default configuration indicates a zero phase shift to be applied to each of the multiple antenna elements.

In Aspect 26, the method of any of Aspects 22 to 25 includes where the default configuration indicates terminating power for each of the multiple antenna elements.

In Aspect 27, the method of any of Aspects 22 to 26 includes where transmitting the default configuration includes transmitting the default configuration in RRC signaling.

In Aspect 28, the method of any of Aspects 22 to 27 includes where the default configuration is part of a periodic configuration of applying multiple different configurations to the multiple antenna elements on the RIS at different periodic time intervals.

In Aspect 29, the method of any of Aspects 22 to 28 includes where the first configuration indicates at least one of a first time gap for applying the first configuration from a start of the time interval indicated for the first configuration, or a second time gap for applying the default configuration from an end of the time interval indicated for the first configuration.

In Aspect 30, the method of Aspect 29 includes receiving, from the RIS, a minimum value for the first time gap or the second time gap.

In Aspect 31, the method of any of Aspects 22 to 30 includes where the first configuration indicates a first priority for the first configuration, and transmitting, to the RIS, a second configuration indicating a second priority for the second configuration, where the second configuration is associated with a time interval that overlaps the time interval of the first configuration.

Aspect 32 is an apparatus for wireless communication including a transceiver, a memory configured to store instructions, and one or more processors communicatively coupled with the memory and the transceiver, where the one or more processors are configured to execute the instructions to cause the apparatus to perform one or more of the methods of any of Aspects 1 to 31.

Aspect 33 is an apparatus for wireless communication including means for performing one or more of the methods of any of Aspects 1 to 31.

Aspect 34 is a computer-readable medium including code executable by one or more processors for wireless communications, the code including code for performing one or more of the methods of any of Aspects 1 to 31.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A reconfigurable intelligent surface (RIS), comprising:
   multiple antenna elements;
   a memory configured to store instructions; and
   one or more processors communicatively coupled with the memory, wherein the one or more processors are configured to:
   receive a radio resource control (RRC) signal indicating a default configuration to apply to the multiple antennas;
   receive a first configuration having a time interval for applying the first configuration to reflect signals from a network node;
   apply the first configuration to the multiple antenna elements for the time interval; and
   apply, based on expiration of the time interval, the default configuration, that is different from the first configuration, to the multiple antenna elements.

2. The RIS of claim 1, wherein the default configuration indicates a pseudo-random configuration for each of the multiple antenna elements.

3. The RIS of claim 2, wherein the pseudo-random configuration indicates a different phase shift to be applied to each of the multiple antenna elements.

4. The RIS of claim 1, wherein the default configuration indicates a zero phase shift to be applied to each of the multiple antenna elements.

5. The RIS of claim 1, wherein the default configuration indicates decreasing or disabling reflection from each of the multiple antenna elements.

6. The RIS of claim 1, wherein the one or more processors are further configured to:
   receive, from the network node, a second configuration having a second time interval for applying the second configuration to reflect signals from a network node;
   apply the second configuration to the multiple antenna elements for the second time interval; and
   apply, based on expiration of the second time interval, the first configuration, that is different from the second configuration, to the multiple antenna elements, wherein the expiration of the second time interval is based on a starting time indicated for the first configuration.

7. The RIS of claim 6, wherein the second configuration is part of a periodic configuration of applying multiple different configurations to the multiple antenna elements at different periodic time intervals.

8. The RIS of claim 7, wherein the one or more processors are configured to apply the second configuration at least in part by switching from one of the multiple different configurations of the periodic configuration to the second configuration, and wherein the one or more processors are further configured to determine the first configuration as a different one of the multiple different configurations in the periodic configuration based on a slot index or a symbol index.

9. The RIS of claim 7, wherein the one or more processors are configured to apply the second configuration at least in part by switching from one of the multiple different configurations of the periodic configuration to the second configuration, and wherein the one or more processors are further configured to determine the first configuration as a first one of the multiple different configurations in the periodic configuration.

10. The RIS of claim 7, wherein the one or more processors are configured to apply the second configuration at least in part by switching from one of the multiple different configurations of the periodic configuration to the second configuration, and wherein the one or more processors are further configured to determine the first configuration as a next one of the multiple different configurations in the periodic configuration after the second configuration.

11. The RIS of claim 7, wherein the one or more processors are configured to apply the second configuration at least in part by switching from one of the multiple different configurations of the periodic configuration to the second configuration, and wherein the one or more processors are further configured to determine the first configuration as a next one of the multiple different configurations in the periodic configuration after one of the multiple different configurations in the periodic configuration that is closest to the second configuration.

12. The RIS of claim 7, wherein the one or more processors are configured to apply the first configuration after a time gap from an end of the time interval indicated for the second configuration.

13. The RIS of claim 12, wherein the one or more processors are further configured to indicate, to the network node, a minimum value for the time gap.

14. The RIS of claim 1, wherein the one or more processors are configured to apply the first configuration after a time gap from a start of the time interval indicated for the first configuration.

15. The RIS of claim 14, wherein the one or more processors are further configured to indicate, to the network node, a minimum value for the time gap.

16. A method for wireless communication, comprising:
receiving, at a reconfigurable intelligent surface (RIS), a radio resource control (RRC) signal indicating a default configuration to apply to the multiple antennas;
receiving, at the RIS, a first configuration having a time interval for applying the first configuration to reflect signals from a network node;
applying the first configuration to multiple antenna elements on the RIS for the time interval; and
applying, based on expiration of the time interval, the default configuration, that is different from the first configuration, to the multiple antenna elements on the RIS.

17. The method of claim 16, wherein the default configuration indicates a pseudo-random configuration for each of the multiple antenna elements that indicates a different phase shift to be applied to each of the multiple antenna elements.

18. The method of claim 16, wherein the default configuration indicates a zero phase shift to be applied to each of the multiple antenna elements.

19. The method of claim 16, wherein the default configuration indicates decreasing or disabling reflection from each of the multiple antenna elements.

20. The method of claim 16, further comprising:
receiving, from the network node, a second configuration having a second time interval for applying the second configuration to reflect signals from a network node;
applying the second configuration to the multiple antenna elements for the second time interval; and
applying, based on expiration of the second time interval, the first configuration, that is different from the second configuration, to the multiple antenna elements, wherein the expiration of the second time interval is based on a starting time indicated for the first configuration.

21. The method of claim 20, wherein the second configuration is part of a periodic configuration of applying multiple different configurations to the multiple antenna elements on the RIS at different periodic time intervals.

* * * * *